United States Patent Office.

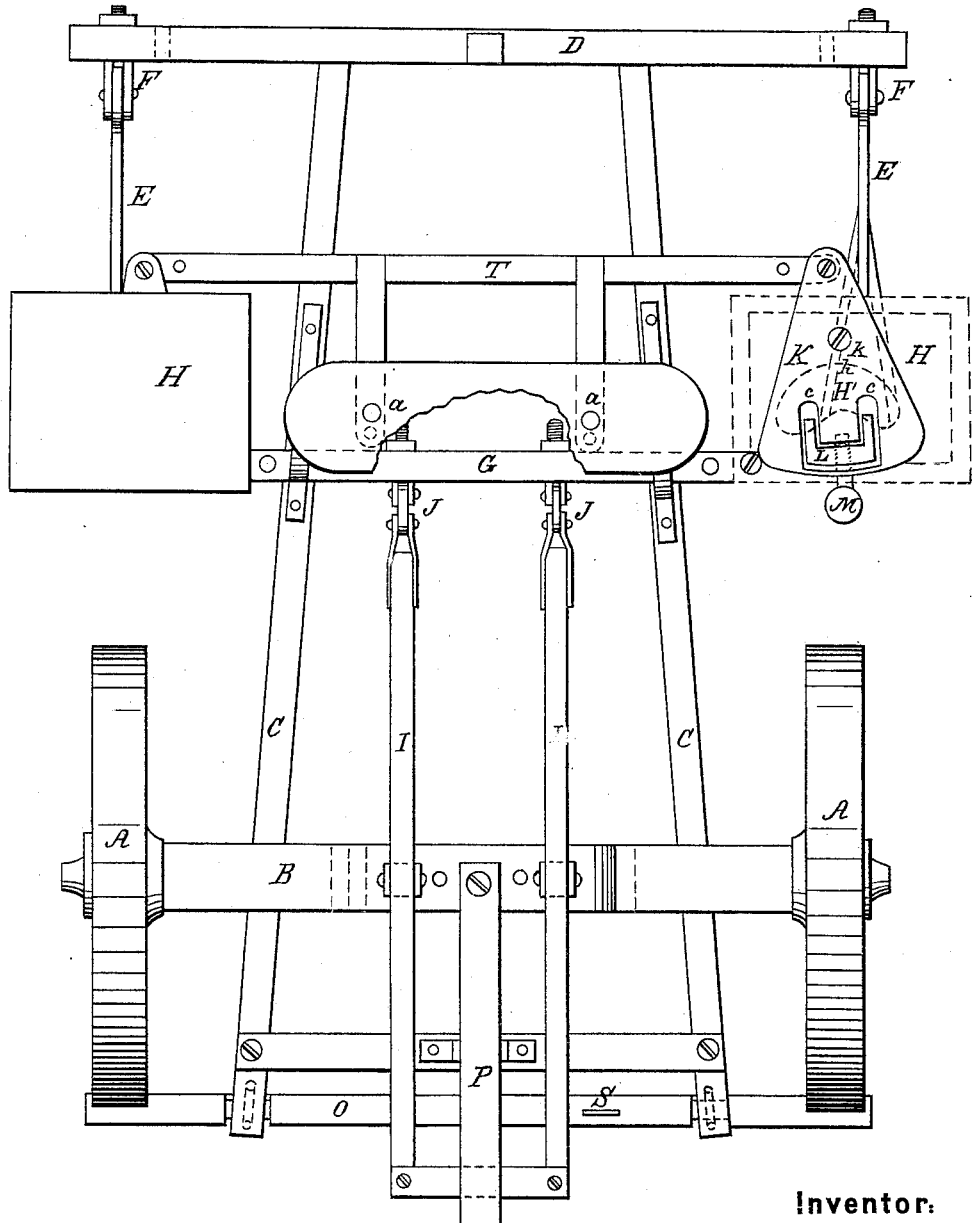

A. M. CORBIT, OF BETHLEHEM, IOWA.

Letters Patent No. 63,219, dated March 26, 1867.

---

IMPROVEMENT IN CORN PLANTERS

---

*The Schedule referred to in these Letters Patent and making part of the same.*

---

TO ALL WHOM IT MAY CONCERN:

Be it known that I, A. M. CORBIT, of Bethlehem, in the county of Wayne, and State of Iowa, have invented a new and improved Corn Planter; and I do hereby declare that the following is a full, clear, and exact description thereof, which will enable others skilled in the art to make and use the same, reference being had to the accompanying drawings, forming part of this specification.

This invention consists in a novel manner of constructing and arranging the slides in the seed-box, which are so made that the flow of seed may be regulated according to the quantity required to be sown. The slides are furthermore provided with slots or perforations in such a manner that the seed may pass from one slide to the other without clogging up, the hole in the lower slide being closed, while the seed passes through the scrapers to the ground.

The invention further consists in the manner of securing the seed-box, the scrapers, and the wheels to the main frame, which is such that all the parts may be adjusted, as to width, for the purpose of varying the distance between the rows of corn.

In the accompanying drawing my invention is illustrated, the figure representing a plan or top view of my improved corn planter, partly in section.

The wheels A are hung upon the axle B. To the axle is attached the main frame, which consists of the longitudinal bars or hounds C C, and of the cross-bars D, G, and Q.

Upon either end of the cross-bar G is arranged a seed-box, H. The bottom of each box is closed by a board, having a square-shaped hole through its centre. Above this board is arranged the slide K, which is pivoted by the pin $k$, and to which is given an oscillating motion by means of levers, which pass through holes in the stationary board $a$ into the arms $b$, the latter being connected to the bar T, which is pivoted to the slides $k$, as seen in the drawing. By moving the levers to the right and left, the aforementioned motion is imparted to the slide K.

The slide K is provided with two slots, $c$ $c$, which are connected at the rear end, so that a small plate, L, may be inserted in these slots. The plate L can be moved forward or backward by means of the set-screw M, thus the size of the holes $c$ $c$ can be regulated at will. Above the plate K is secured another plate, H', (which is shown in red lines,) which is provided with a curved slot, $h$, the slot being so shaped that the holes $c$ in the lower plate can only communicate with it when under its ends. This slot $h$ may as well be left off, and simply two holes arranged in the plate H.

The corn is placed into the seed-box upon the plate H. It drops through the hole or holes $h$ upon the plate K. As soon as one of the holes $c$ in the latter plate is directly underneath the hole $h$, the seed drops into the hole C upon the bottom board. By the movement of the plate K the seed which is held in the holes $c$ $c$ is conveyed to the square-shaped hole in the said bottom board, through which it drops to the ground. Suitable seed tubes may be attached below the bottom board to convey the seed to the ground, and to prevent its being scattered by the wind. Scrapers, E, are arranged below the seed-box, in front of the seed tubes, and are secured to the cross-bar D by means of hinges, E.

The front part of the frame, and with it the scrapers E, may be raised out of the ground by pressing upon the rear end of a treadle, I, which is secured to uprights on the axle B, and is hinged to the cross-bar G, as seen.

The driver's seat, N, is secured to the axle B by means of a brace, P.

A rock-shaft, O, is arranged on the rear end of the machine, and may be turned by a lever, S, so as to raise the ploughs or scrapers, which are attached to the rock-shaft out of the ground.

The cross-bar G is provided with holes, so as to set the seed-boxes nearer to the centre of the machine. The bar T is also provided with such holes, to adjust the slides K to every position of the seed-box.

The scrapers E may be adjusted in a similar manner on the cross-bar D, and the wheels A on the axle B. Thus this machine may be employed for planting corn in rows, the distance between which may be regulated at will.

What I claim as new, and desire to secure by Letters Patent, is—

1. The combination of the plate K with the plate L and set-screw M, for the purpose of regulating the amount of seed through the holes $c$ $c$, all made and operating substantially as herein shown and described.

2. I claim the cross-bars D, T, and G, which are so made and provided with holes that the scrapers E, plates K, and seed-boxes R, may be moved more or less apart, so as to permit the planting of the corn in rows of suitable distances from each other, substantially as herein shown and described.

A. M. CORBIT.

Witnesses:
    J. F. PUMPHREY,
    WM. MUNGER.